United States Patent
Iwama et al.

(10) Patent No.: US 7,643,855 B2
(45) Date of Patent: Jan. 5, 2010

(54) PORTABLE TERMINAL DEVICE

(75) Inventors: Yoshihiro Iwama, Kokubunji (JP); Koji Suso, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 11/350,026

(22) Filed: Feb. 9, 2006

(65) Prior Publication Data
US 2007/0015551 A1    Jan. 18, 2007

(30) Foreign Application Priority Data
Jul. 12, 2005   (JP) ............................. 2005-202400

(51) Int. Cl.
*H04M 1/00*   (2006.01)

(52) U.S. Cl. ................. 455/575.1; 455/575.3; 455/571; 455/572; 455/573; 429/90; 429/91

(58) Field of Classification Search ............. 455/575.1, 455/575.3, 571, 572, 573
See application file for complete search history.

(56) References Cited

U.S. PATENT DOCUMENTS

| | | | |
|---|---|---|---|
| 6,625,030 B1 * | 9/2003 | Haixiong | 361/737 |
| 6,869,708 B2 * | 3/2005 | Kelley et al. | 429/23 |
| 6,955,863 B2 * | 10/2005 | Bean et al. | 429/96 |
| 7,128,106 B2 * | 10/2006 | Becerra et al. | 141/349 |
| 7,291,191 B2 * | 11/2007 | Kaye | 55/385.4 |
| 7,359,739 B2 * | 4/2008 | Ogura | 455/575.1 |
| 2004/0067412 A1 * | 4/2004 | Shimizu et al. | 429/92 |
| 2004/0086755 A1 * | 5/2004 | Kalal | 429/19 |
| 2005/0053883 A1 * | 3/2005 | Faber | 431/253 |
| 2006/0194082 A1 * | 8/2006 | Tucker et al. | 429/9 |
| 2006/0204816 A1 * | 9/2006 | Yamaguchi | 429/34 |
| 2006/0228594 A1 * | 10/2006 | Suh | 429/9 |
| 2006/0257707 A1 * | 11/2006 | Kaschmitter et al. | 429/34 |

FOREIGN PATENT DOCUMENTS

| | | |
|---|---|---|
| JP | 2002-049440 | 2/2002 |
| JP | 2004-055307 | 2/2004 |

* cited by examiner

*Primary Examiner*—Yuwen Pan
(74) *Attorney, Agent, or Firm*—Brundidge & Stanger, P.C.

(57) ABSTRACT

A portable phone including a connecting member such as a hinge part for coupling a display housing and a grip housing in a manner that a first state in which the display housing and the grip housing are folded together, and a second state in which the display housing and the grip housing are coupled at one end, are exchangeable. The display housing includes a display unit, a fuel cell, and a fuel cartridge, and the grip housing includes an operation part and a rechargeable part for storing electricity generated by the fuel cell, the fuel cartridge is detachably mounted on the side face of the display housing.

9 Claims, 11 Drawing Sheets

FIG. 5A    FIG. 5B    FIG. 5C
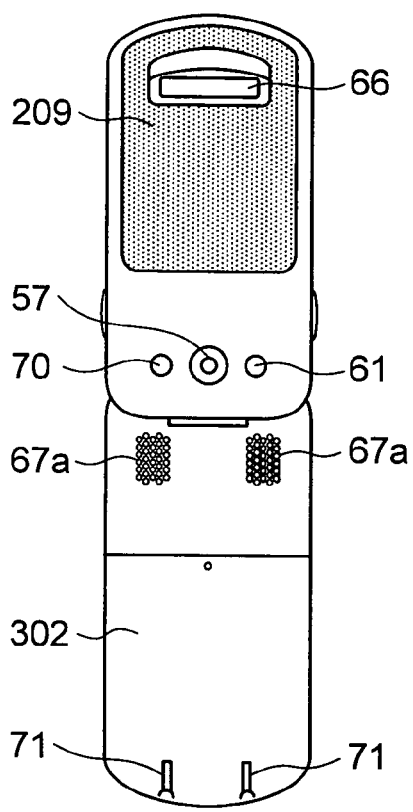
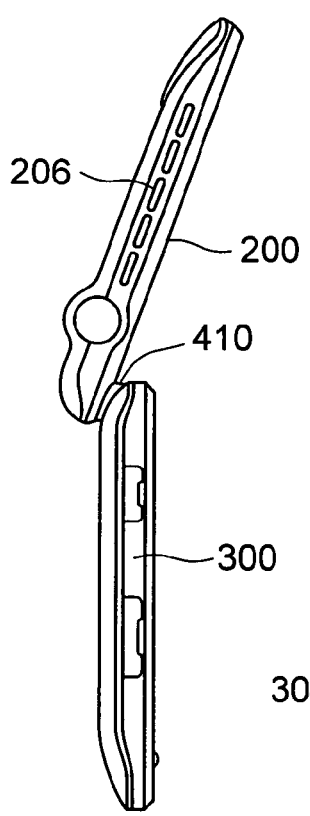
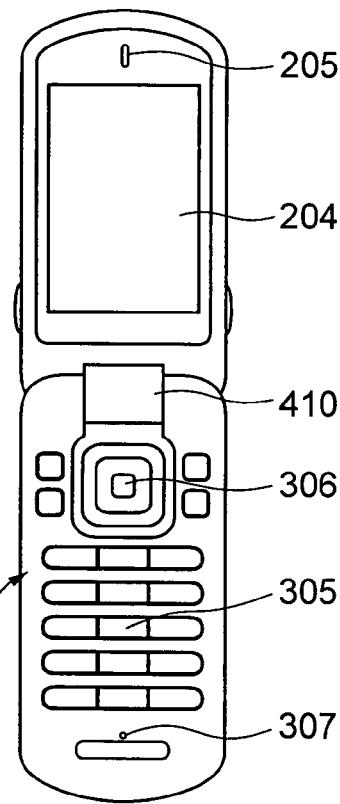
FIG. 5D    FIG. 5E
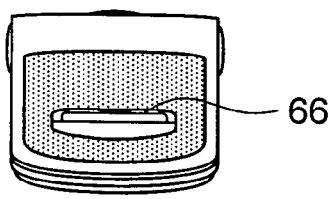
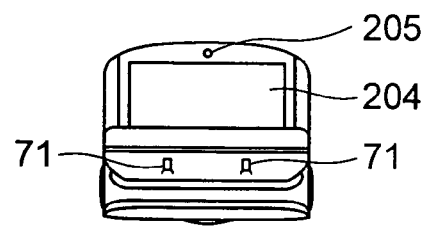

PORTABLE TERMINAL DEVICE

INCORPORATION BY REFERENCE

The present application claims priority from Japanese application JP2005-202400 filed on Jul. 12, 2005, the content of which is hereby incorporated by reference into this application.

BACKGROUND OF THE INVENTION

The present invention relates to a portable terminal device, such as a mobile phone, which includes a fuel cell.

In recent years, portable terminal devices, such as mobile phones, have become household items essential to life. The portable terminal devices, such as portable phones, generally have a built-in charging battery cell which is charged repeatedly and supplies electric power to the portable terminal devices. However, as the mobile phones of late years have come to have increasingly diverse functions and their power consumption has increased, so that it becomes difficult to supply enough electric power only from a conventional charging battery cell.

As a type to compensate for shortage of the power generating capacity, portable terminal devices are known which are equipped with another battery cell in addition to a conventional rechargeable cell.

For example, as a prior-art example of portable terminal device of this kind, JP-A-2002-49440 discloses a portable terminal device which includes two battery cells: a rechargeable cell and a fuel cell.

SUMMARY OF THE INVENTION

In the above-mentioned prior-art, a fuel is supplied from a fuel cartridge mounted on the housing, which juts out sizably from the housing.

In portable terminal devices, such as a mobile phone, since emphasis is placed on the portability, it is important how to locate the fuel cell, while on the other hand there is a problem of the moisture produced when the fuel cell generates power.

Therefore, the present invention has as its object to provide a portable terminal device which includes a fuel cell but offers enhanced portability.

To achieve the above object, according to the present invention there is provided a portable terminal device (portable phone), to be specific, a portable phone comprises a foldable hinge part for movably coupling a first housing and a second housing together through the intermediary thereof, wherein the foldable hinge part couples the first housing and the second housing in a manner capable of assuming a first state that the first housing and the second housing are folded together, and also assuming a second state that the first housing and the second housing are coupled at one end in the longitudinal direction thereof, wherein the first housing includes a speaker part, a display part, a fuel cell part, and exhaust openings, and the second housing includes a microphone part, a ten-key part, and a rechargeable cell part for storing electricity generated by the fuel cell part, and wherein the speaker part and the microphone part are arranged at a one end side when the first housing and the second housing face opposite to each other in the second state, the ten-key part is arranged on a housing face to be concealed in the first state and exposed in the second state, and the exhaust openings are arranged on a housing face always exposed both in the first and second states.

Further, to achieve the above object, according to the present invention, a portable terminal device (portable phone) is provided, specifically, a portable phone comprises a foldable hinge part for movably coupling a first housing and a second housing together through the intermediary thereof, wherein the foldable hinge part couples the first housing and the second housing in a manner capable of assuming a first state that the first housing and the second housing are folded together, and also assuming a second state that the first housing and the second housing are coupled at one end in the longitudinal direction thereof, wherein the first housing includes a speaker part, a display part, a fuel cell part, a fuel cylinder holder, and exhaust openings, and the second housing includes a microphone part, a ten-key part, and a rechargeable cell part for storing electricity generated by the fuel cell part, and wherein the speaker part and the microphone part are arranged at a one end side when the speaker part and the microphone part face opposite to each other in the second state, the ten-key part is arranged on a housing face to be concealed in the first state and exposed in the second state, and the exhaust openings are arranged on a housing face always exposed both in the first and second states, and the fuel cylinder holder is capable of detachably mounting said fuel cylinder for supplying a fuel to said fuel cell part.

BRIEF DESCRIPTION OF THE DRAWINGS

FIGS. 5A through 5E are external views of a second state of the portable phone according to the first embodiment.

DETAILED DESCRIPTION OF THE INVENTION

Figure 1:
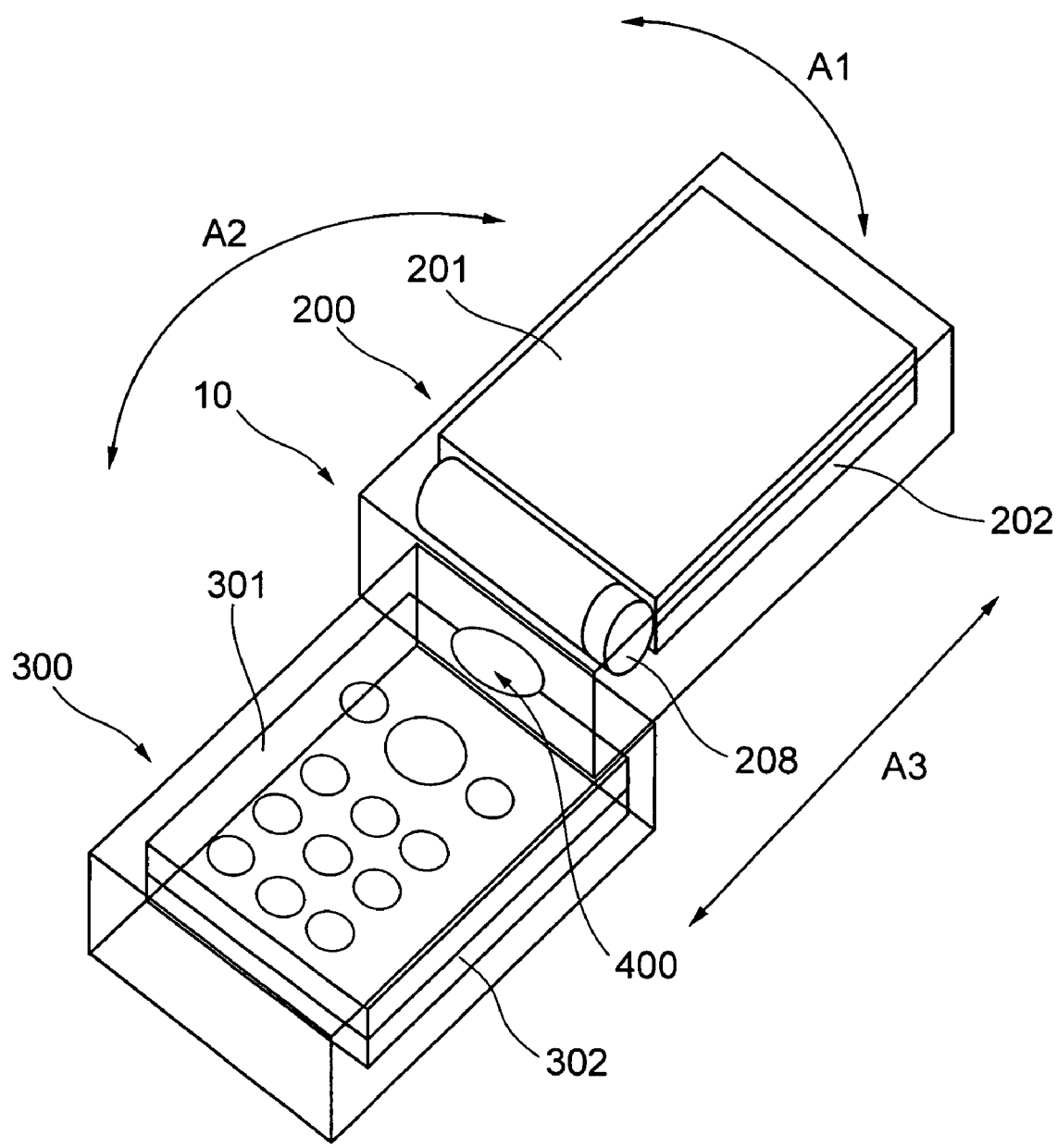
FIG. 1 is a schematic structure diagram of a portable phone according to the present invention.

The portable terminal device according to the present invention will be described in detail by taking a portable phone for example, referring to FIGS. 1 to 11. FIG. 1 is a schematic structure diagram of a portable phone according to the present invention, FIGS. 2 to 7 show the first embodiment of the present invention, FIG. 8 shows the second embodiment, FIGS. 9 and 10 show the third embodiment, and FIG. 11 shows the fourth embodiment. Note that the same reference numerals denote the same parts and directions and repetitive descriptions are avoided.

A schematic structure of the present invention will be described with reference to FIG. 1. FIG. 1 is a general configuration diagram of the portable phone according to the present invention.

One feature of a portable phone according to the present invention is that the portable phone is structured such that a housing 10 is divided into a display housing (first housing) 200, including a display part 201 and a fuel cell part 202, and a grip housing (second housing) 300, including a rechargeable cell part 302 for storing electricity generated by the fuel cell part 202 and an operating part, and that the first housing and the second housing are coupled by a connecting member such as a foldable hinge part 400 in a manner capable of assuming a first state that the first housing and the second housing are folded together, and also assuming a second state that the first housing and the second housing are coupled at one end.

In a portable phone structured as described, as the whole housing 10 is divided into at least two housings, in the first state that the two housings are folded together, the phone can take a compact form, and in the second state, the phone is in speech mode, in which two housings are coupled at one end to each other; therefore, the fold-away ease and portability are improved. Moreover, the power supply unit is formed to include a fuel cell part 202 and a rechargeable cell part 302 for storing electricity generated by the fuel cell part 202, and those two power sources are mounted in two separate housings, and owing to this structure, the balance of weight of the phone is improved in the second state.

Because an operating part 301 is provided on the grip housing 300 and a display part 201 is provided on the display housing 200, while holding the grip housing 300 by one hand, even if the user operates the operating part 301 by the thumb of the one hand holding the grip housing 300 or by a finger of the other hand, the loss of visibility of the display part 201 caused by the finger operation is decreased since an image on the display part 201 is not disturbed from being seen by fingers of the user.

Above all, a salient feature of this portable phone is that because the fuel cell part 202 is provided on the display housing 200 away from the grip housing 300, it is possible to reduce chances for the moisture, produced by the fuel cell part 202, to touch one hand that is holding the grip housing 300.

Further, in the portable phone according to the present invention, with some ingenuity applied to the foldable hinge part 400 that couples the two housings together, it is possible to realize a portable phone provided with polymorphic modes (movements), such as a folding motion indicated by an arrow A1, a rotation indicated by an arrow A2, and a slide indicated by an arrow A3. Embodiments of the invention will be described with reference to FIGS. 2 to 11.

Embodiment 1

Figure 2:
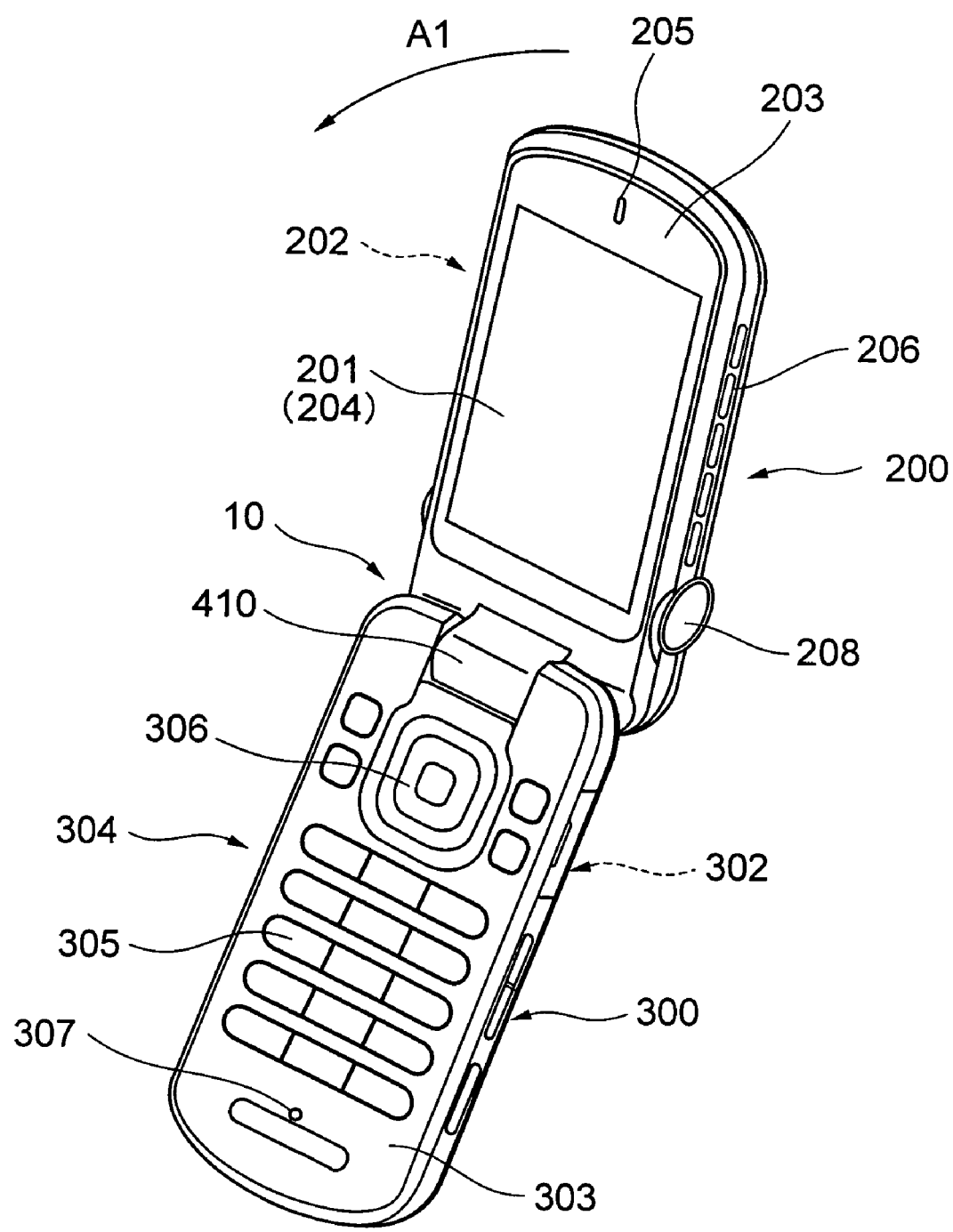
FIG. 2 is an external, perspective view of the portable phone according to a first embodiment of the present invention.

Description will start with a first embodiment by referring to FIGS. 2 to 7. FIG. 2 is an external, perspective view of a portable phone according to the first embodiment.

A general structure of this portable phone is described referring to FIG. 2. In FIG. 2, a housing 10 of the portable phone denoted collectively as numeral 1 is formed divided into a display housing 200, including a display part 201 and a fuel cell part 202, and a grip housing 300, including an operating part 301 and a rechargeable cell 302 for storing electricity generated by the fuel cell part 202, and has a structure that the two housings are coupled together by a folding foldable hinge part 410 so that they can assume two states: a first state that the two housings are folded together and a second state that the two housings are coupled at one end thereof.

In this embodiment, the grip housing 300 as the second housing and the display housing 200 as the first housing are each formed in a thin and flat shape and they are foldably coupled together at one end in the longitudinal direction of their wide faces by a foldable hinge part. FIG. 2 shows the second state that the two housings are open, and by folding the display housing 200 from the second state to the direction indicated by the arrow A1, the housings can be changed to the first state that they are folded together.

In the display housing 200, a display screen part 204 is provided on a layout face 203 which is concealed in the first state and exposed in the second state. On the other hand, in the grip housing 300, an operating part 304, including a ten-key part 305 for inputting letters and numerical values and a function-key part 306 including cursor move keys and function keys, is provided on a layout face 303 which is concealed in the first state and exposed in the second state. The layout faces 203 and 303 have separately provided thereon a speaker part 205 and a microphone part 307 on one-end portion opposite to the other-end portion where the foldable hinge part 410 is located.

According to the structure described above, in the second state, if the user holds the grip housing 300 by one hand, it is possible to assume a talking position with the phone in a position suitable to the ear and the mouth. Furthermore, in this second state, while holding the grip housing 300 by one hand, the user can perform an input operation, looking at the display screen 204.

Though not illustrated, for example, an antislip material, such as a thin rubber plate, may be attached to the peripheral portion of the grip housing 300, by which the gripping quality of the grip housing 300 can be improved.

On the other hand, in the first state, because the phone can be in a compact shape, in which the display screen part 204 and the operating part 304 are concealed and protected by the two housings, the portability is improved.

One feature of this embodiment is that the fuel cell part 202 is located on the display housing 200 away from the grip housing 300. On top of that, the rechargeable cell part 302 for storing electricity generated by the fuel cell part 202 is disposed on the grip housing 300. According to this structure, a proper balance of weight is achieved and the moisture from the exhaust openings 206 provided in the display housing 200 is less likely to directly touches the hand holding the grip housing 300; therefore, it becomes possible to decrease the defect in the use of a fuel cell which produces moisture when it generates electricity.

Figure 3:
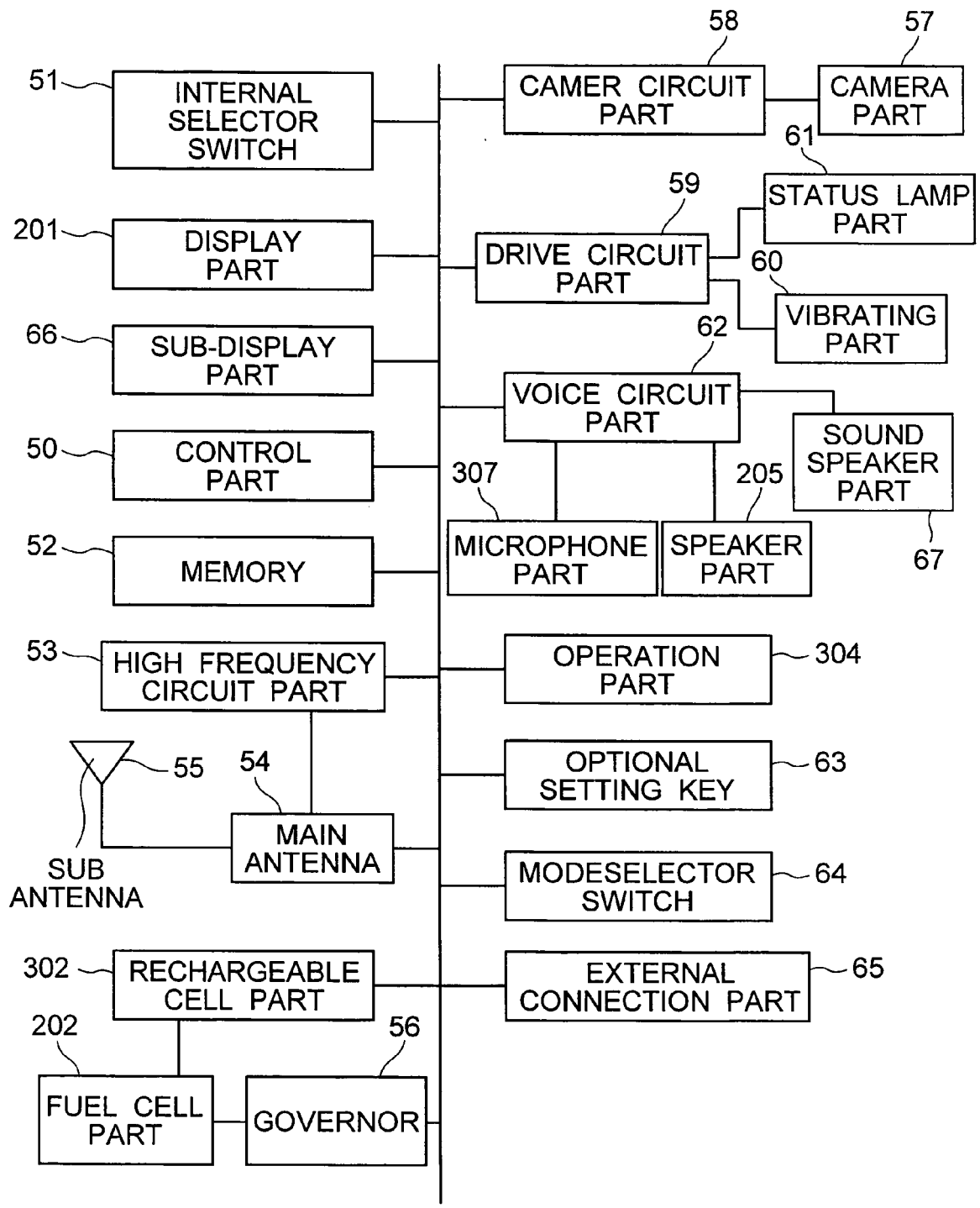
FIG. 3 is a device block diagram of the portable phone according to the first embodiment.

Referring to FIG. 3, description is made next about the device configuration of the portable phone 1 as follows. FIG. 3 is a device block diagram of the portable phone. In FIG. 3, various kinds of devices and switches are connected through a bus to a control part 50 that performs total control of the portable phone 1.

An internal selector switch 51, installed in the grip housing 300, transmits signals in response to open/close motion of the display housing 200. A memory 52 stores various programs and data, and the control part 50 controls the portable phone 1 according to the programs. A high frequency circuit part 53, which serves as a communication unit, is connected with a main antenna 54 and a sub-antenna 55. In this embodiment, as described above, the power supply unit is provided in the form of the fuel cell part 202 and the rechargeable cell part 302. The fuel cell part 202 has the power generation amount controlled by a governor 56 through the control part 50. The camera part 57 is connected to the bus through a camera circuit part 58.

A drive circuit part 59 is connected with a vibrating part 60 which vibrates when a call is received, and a status lamp 61 which notifies the user of arrival of a mail or a call, or occurrence of an alarm by light, and the operation amount or the operation pattern of those parts are controlled by control signals from the control part 50. A voice circuit part 62 is connected to the speaker part 205, a sound speaker part 67, and a microphone part 307.

Further, in this embodiment, the operating part 304, an optional setting key part 63, and a mode selector switch 64 are provided, and by using those operating switches, the user can operate this portable phone 1. Further, in this embodiment, an external connection part 65 is provided, which can be connected through a cord to an external personal computer, for example, to communicate or exchange data.

Figure 4A:
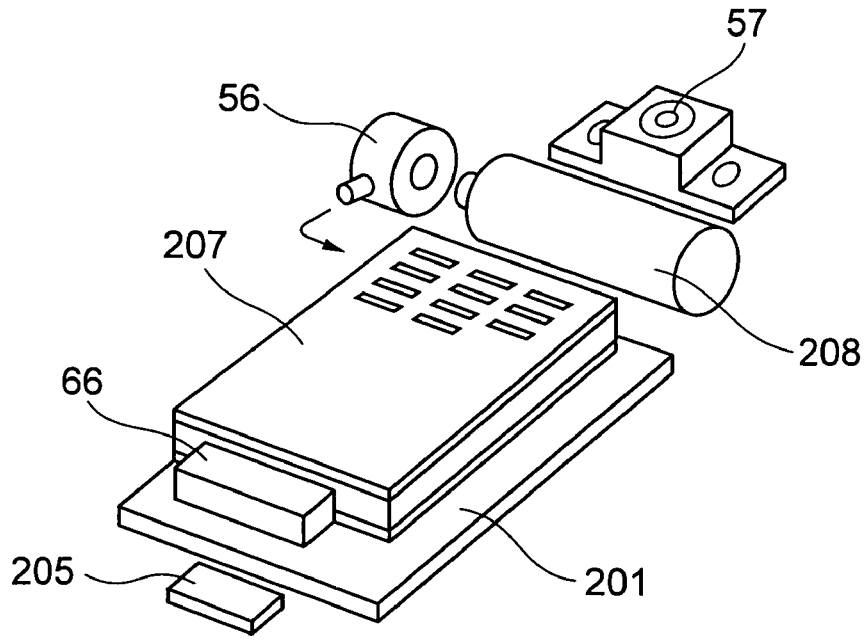
FIGS. 4A and 4B are internal layout diagrams of the portable phone according to the first embodiment.
Figure 4B:
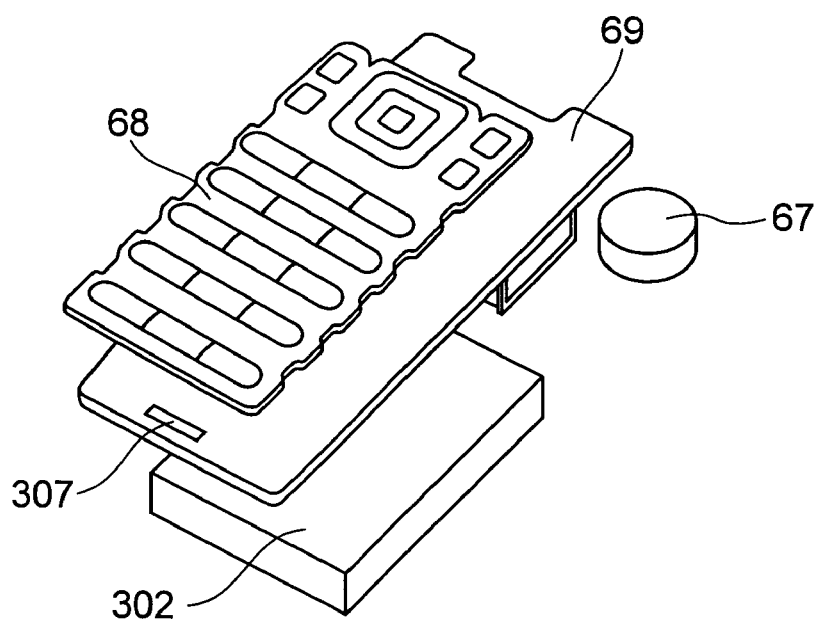

Next, referring to FIGS. 4A and 4B, the layout and the structure of the parts included in the two housings are described. FIGS. 4A and 4B are internal layout diagrams of the portable phone, in which FIG. 4A is an internal layout view of the display housing as seen from the rear side opposite to the layout face, and FIG. 4B is an internal layout view of the grip housing as seen from the layout face side.

In FIG. 4A, a generator part 207 of the flat and thin fuel cell part 202 is arranged at the rear of the thin display part 201 that forms the display screen part 204 of the display housing 200. A fuel cylinder 208 to supply fuel to the generator part 207, a governor 56 to supply fuel from the fuel cylinder 208 to the generator part 207, and the camera part 57 are arranged at one-end side of the foldable hinge part 410, and the speaker part 205 and the sub-display part 66 are arranged at the other-end side facing opposite to the one-end side.

The fuel cylinder 208 is shaped as a circular cylinder long in its axial direction, and the governor 56 is located at one-end side in the longitudinal direction of the fuel cylinder 208. The fuel cylinder 208 is detachably mounted to the governor 56. By this arrangement, compared with an arrangement having only a rechargeable cell 302, the portable phone with the detachable fuel cylinder can be used by replacing the fuel cylinder 208 when necessary and can be recharged any time without being placed on the charging stand.

Meanwhile, in FIG. 4B, in the grip housing 300, an operation substrate 68, a control substrate 69, and a rechargeable cell 302 are stacked one on top another, and the sound speaker 67 is arranged on the side of the grip housing where there is the foldable hinge part 410 and the microphone part 307 is arranged on the other side of the grip housing.

The signal lines and the power supply lines between the two housings are wired through the foldable hinge part 410.

Figure 6A:
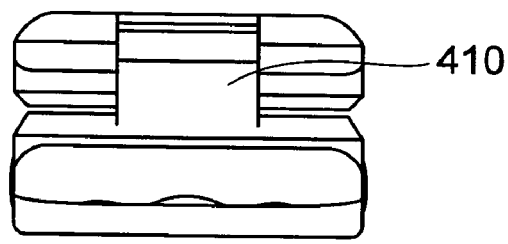
FIGS. 6A, 6B and 6C are external views of a first state of the portable phone according to the first embodiment.
Figure 6B:
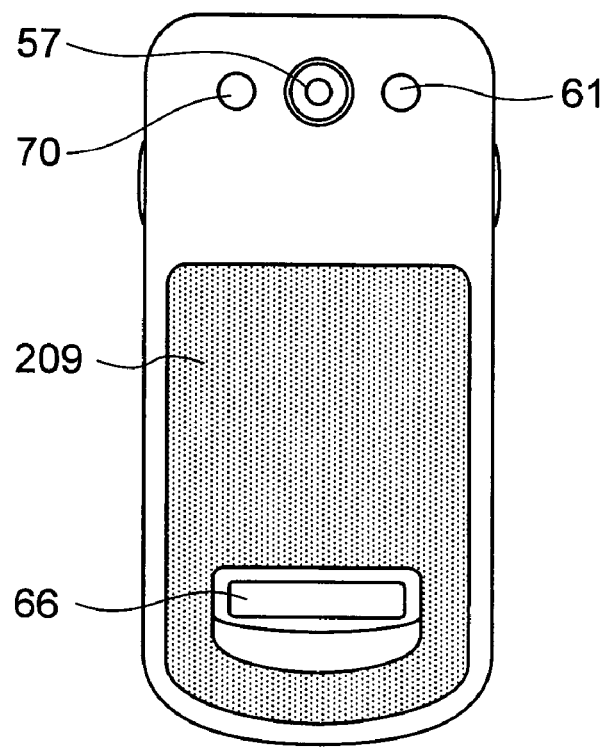
Figure 6C:
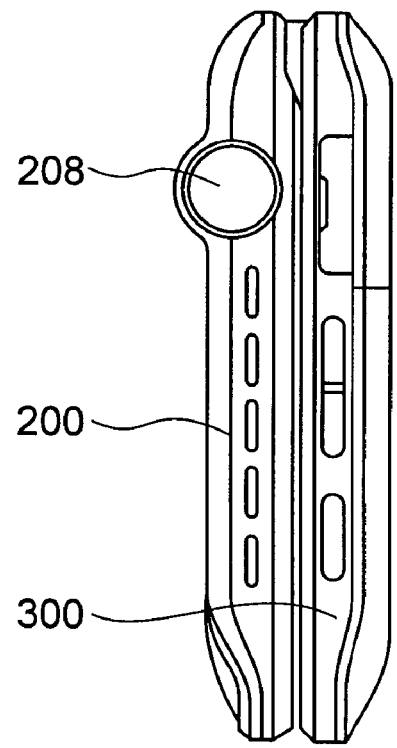

Referring to FIGS. 5A to 5E and FIGS. 6A to 6C, the external structure of the portable phone 1 is described below. FIGS. 5A to 5E are exterior views of the portable phone in the second state. FIG. 5A is a rear view, FIG. 5B is a left-side view, FIG. 5C is a front view, FIG. 5D is a top view, and FIG. 5E is a bottom view. FIGS. 6A to 6C are exterior views of the portable phone in the second state. FIG. 6A is a top view, FIG. 6B is a front view, and FIG. 6C is a right-side view. The names of the views of FIGS. 5A to 5E and FIGS. 6A to 6C are based on the assumption that FIG. 5C is a front view.

In FIGS. 5A to 5E and FIGS. 6A to 6C, in this embodiment, the exhaust openings 206 are provided in the lateral side faces of the display housing 200 and in the housing face 209 opposite to the layout face 203, to thereby discharge the moisture produced by the fuel cell part 202. The exhaust openings 206 provided in the housing face 209 are arranged leaned upwards in consideration of preventing the moisture from touching the hand holding the phone in the second state. The sub-display part 66 is arranged in the center of the exhaust openings 206; and the camera part 57, a flash 70, and a status lamp part 61 are provided at the lower portion of the housing face 209.

In this embodiment, the fuel cylinder 208, which can be mounted from the lateral side of the display housing 200, is attached to the display housing 200. This fuel cylinder 208 is loaded in a compartment, not shown, which is formed by having a part of the housing face 209 swollen slightly.

On the other hand, a sound emitter part 67*a* of the sound speaker part 67 is provided at the foldable hinge part 410 side of the housing face 308 facing opposite to the layout face 303 of the grip housing 300, and a detachable rechargeable cell 302 is provided at the other side of the grip housing 300. This rechargeable cell 302 is provided with charging terminals 71 and can also be charged on a charging stand.

Figure 7:
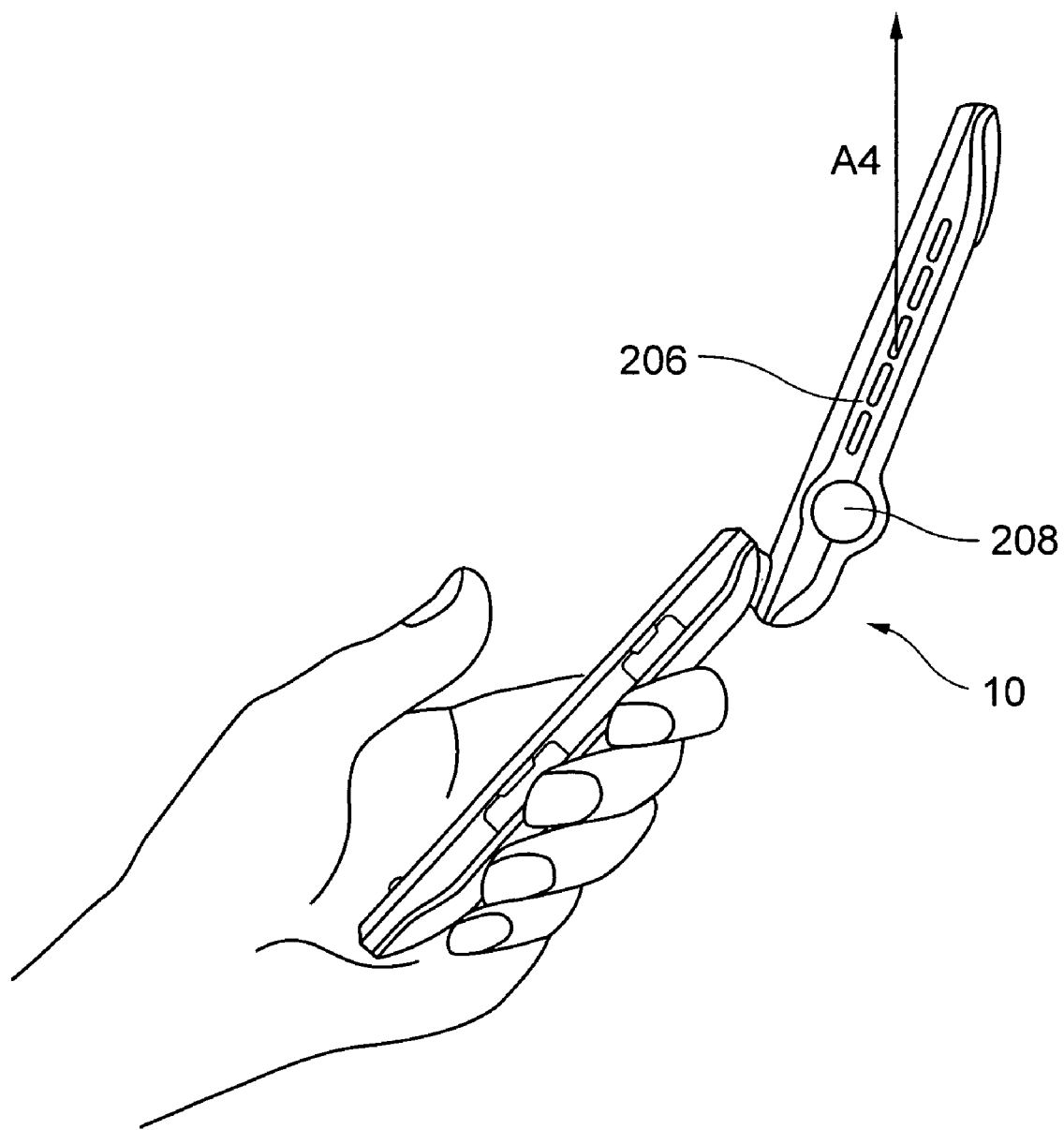
FIG. 7 is a drawing of the use condition of the portable phone according to the first embodiment.

Referring to FIG. 7, description is made of the use condition of the portable phone 1. FIG. 7 is an illustration for reference purposes. As described earlier, when the portable phone 1 of this embodiment is in the second state, the grip housing 300 can be held in one hand. According to this gripped form, the grip housing 300 fits comfortably in the palm of one hand, and the display housing 200 extends upwards from the grip housing 300 held by one hand. Therefore, regardless of whether the operating part 301 is operated by fingers of the hand holding the phone or by fingers of the other hand, the loss of visibility of the display screen part 204 on the display housing 200 is reduced. Moreover, the moisture issuing from the exhaust openings 206 of the display housing 200 is discharged upwards as indicated with an arrow A4; therefore, the moisture that would touch the hand holding the phone can be decreased.

The fuel cylinder 208 is easy to use because it can be mounted or dismounted from the lateral side of the display housing 200 extending upwards.

Embodiment 2

Referring to FIGS. 8A to 8D, description is made of a second embodiment of the present invention. FIG. 8 is an explanatory diagram showing other applications of the foldable hinge part.

As shown in FIGS. 8A to 8D, in the first embodiment, the phone of the second embodiment is structured such that the fuel cylinder 208 is mounted in the display housing 200. In contrast, in the second embodiment, the phone is structured such that the fuel cylinder 208 is disposed in the foldable hinge part 410. In this case, by having the rotating center axis P of the foldable hinge part 410 coincide with the center axis of the fuel cylinder 208, the fuel cylinder 208 can be accommodated in a compact form in the housing 10.

8A: The foldable hinge part 410 shown in FIG. 8A includes a first hinge part 411 with a wide width, arranged at the center of one-end of the grip housing 300, and a pair of second hinge parts 412 formed on both sides of one-end of the display housing 200. The foldable hinge part 410 is structured such that the pair of second hinge parts 412 is supported on both sides of the first hinge part 411. In this embodiment, the fuel cylinder 208 is mounted in the first hinge part 411. The governor 56 is placed either on the first hinge part 411 or on the second hinge part 412. In this case, if the governor 56 is not arranged at the display housing 200, a pipe, which couples the governor 56 and the generator part 207 together, is arranged in a manner of passing through the rotating axis P of the foldable hinge part 410.

Figure 8A:
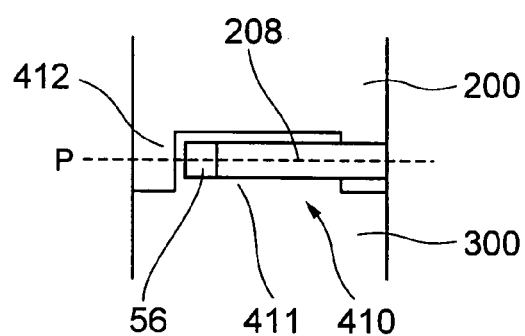
FIGS. 8A through 8D are explanatory diagrams showing other applications of the foldable hinge part of a portable phone according to a second embodiment of the present invention.
Figure 8B:
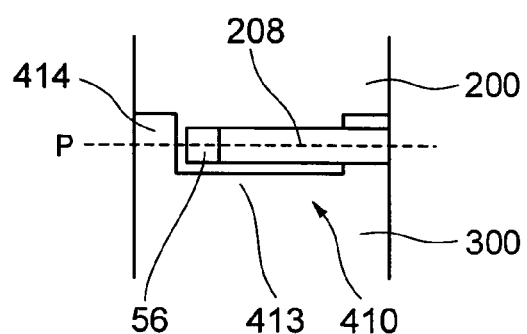
Figure 8C:
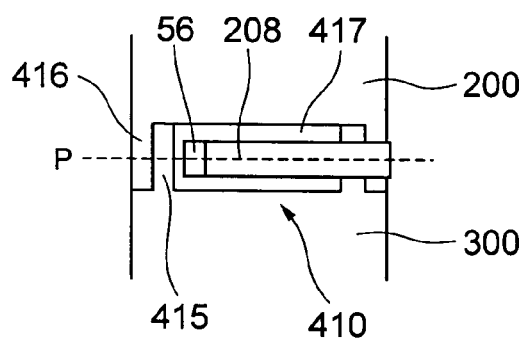
Figure 8D:
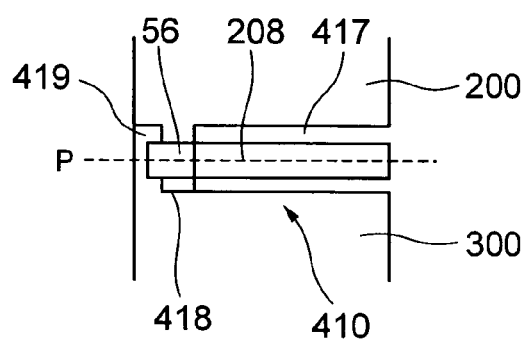
Figure 9A:
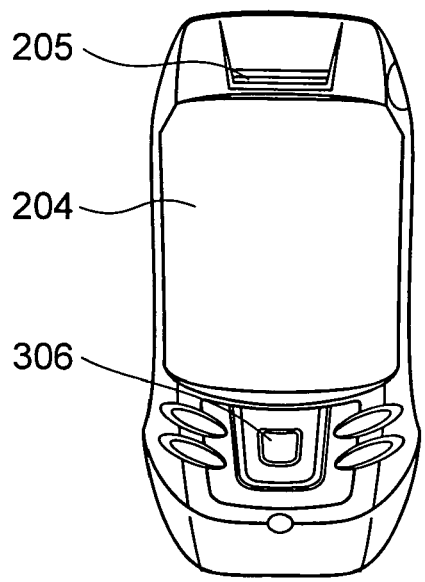
FIGS. 9A through 9E are external views of a first state of a portable phone according to a third embodiment of the present invention.
Figure 9B:
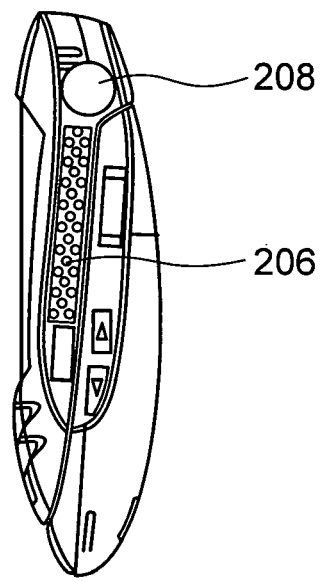
Figure 9C:
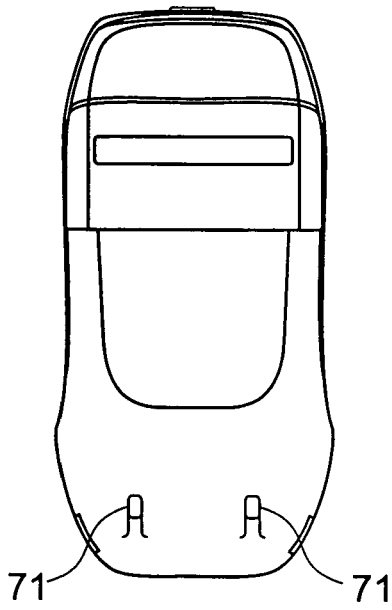
Figure 9D:
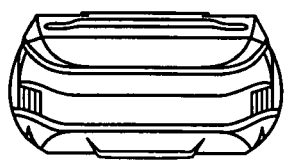
Figure 9E:
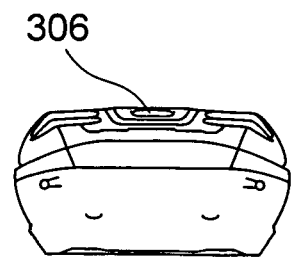

8B: The foldable hinge part 410 shown in FIG. 8B is an inverted (upside down) version of the embodiment of FIG. 8A. In other words, this foldable hinge part 410 includes a first hinge part 413 with a wide width, located at the center of one-end of the display housing 200, and a pair of the second hinge parts 414 formed on both sides of one-end of the grip housing 300. The foldable hinge part 410 is structured such that the pair of second hinge parts 414 is supported on both sides of the first hinge part 413. In this embodiment, the fuel cylinder 208 is mounted in the first hinge part 413. The governor 56 is placed either on the first hinge part 413 or on the second hinge part 414. In this case, if the governor 56 is not arranged at the grip housing 300, a pipe, coupling the governor 56 and the generator part 207 together, is arranged in a manner of passing through the rotating axis P of the foldable hinge part 410.

8C: The foldable hinge part 410 shown in FIG. 8C includes a pair of first hinge parts 415 formed on both sides of the grip housing 300, and a pair of second hinge parts 416 formed on both sides of one-end of the display housing 200. The foldable hinge part 410 is structured such that the pair of second hinge parts 416 are supported by the two end portions of the first hinge parts 415. In this embodiment, a store space 417 for accommodating a fuel cylinder 208 is formed between two pairs of hinge parts 415 and 416. In this case, the governor 56 is set in the hinge parts on either one of the two sides.

8D: The foldable hinge part 410 shown in FIG. 8D includes a first hinge part 418 and a second hinge part 419 formed on one side at one-end of each of the grip housing 300 and the display housing 200, and a free space on the other side is used as a store space 417 for accommodating a fuel cylinder 208.

The present invention is not limited to the four embodiments described above, but may be applied to a hinge part other than the hinge part rotatably coupling the two housings together.

In the above embodiments, it is effective to mount a fuel cylinder 208 from the direction of rotating axis P. In this case, when there are hinge parts on both sides in the longitudinal direction of the fuel cylinder 208, an opening for inserting the fuel cylinder is formed at the hinge part of the insertion side, and a spring or the like which regulates the rotating angle or the motion of the hinge part may be provided at the other hinge part.

For some phone which has hinge parts on both sides of the fuel cylinder 208, it is possible to devise a structure which allows the fuel cylinder to be inserted from the layout face side. According to this structure, it is possible to simplify a fixture means for fixing the fuel cylinder 208.

Embodiment 3

Figures 10A, 10B, 10C:
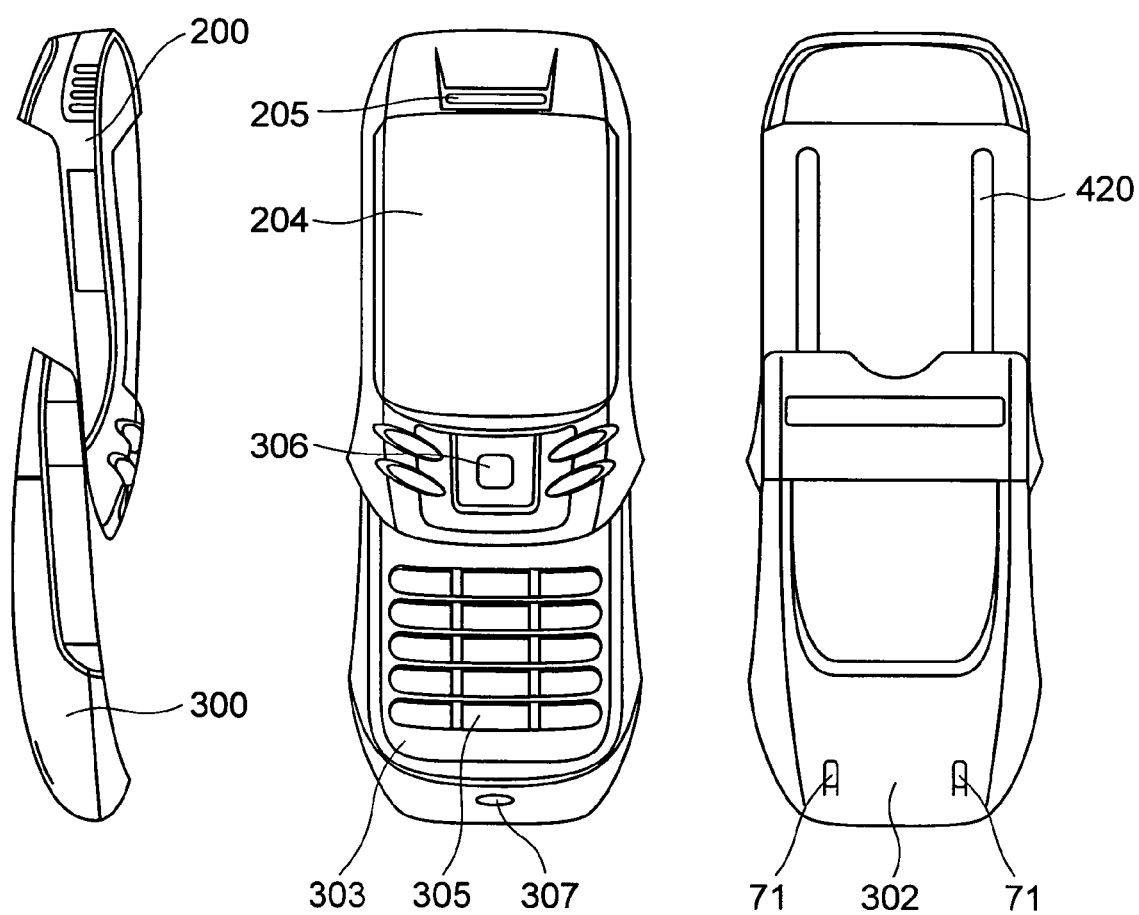
FIGS. 10A, 10B and 10C are external views of the portable phone according to the third embodiment.
Figure 11:
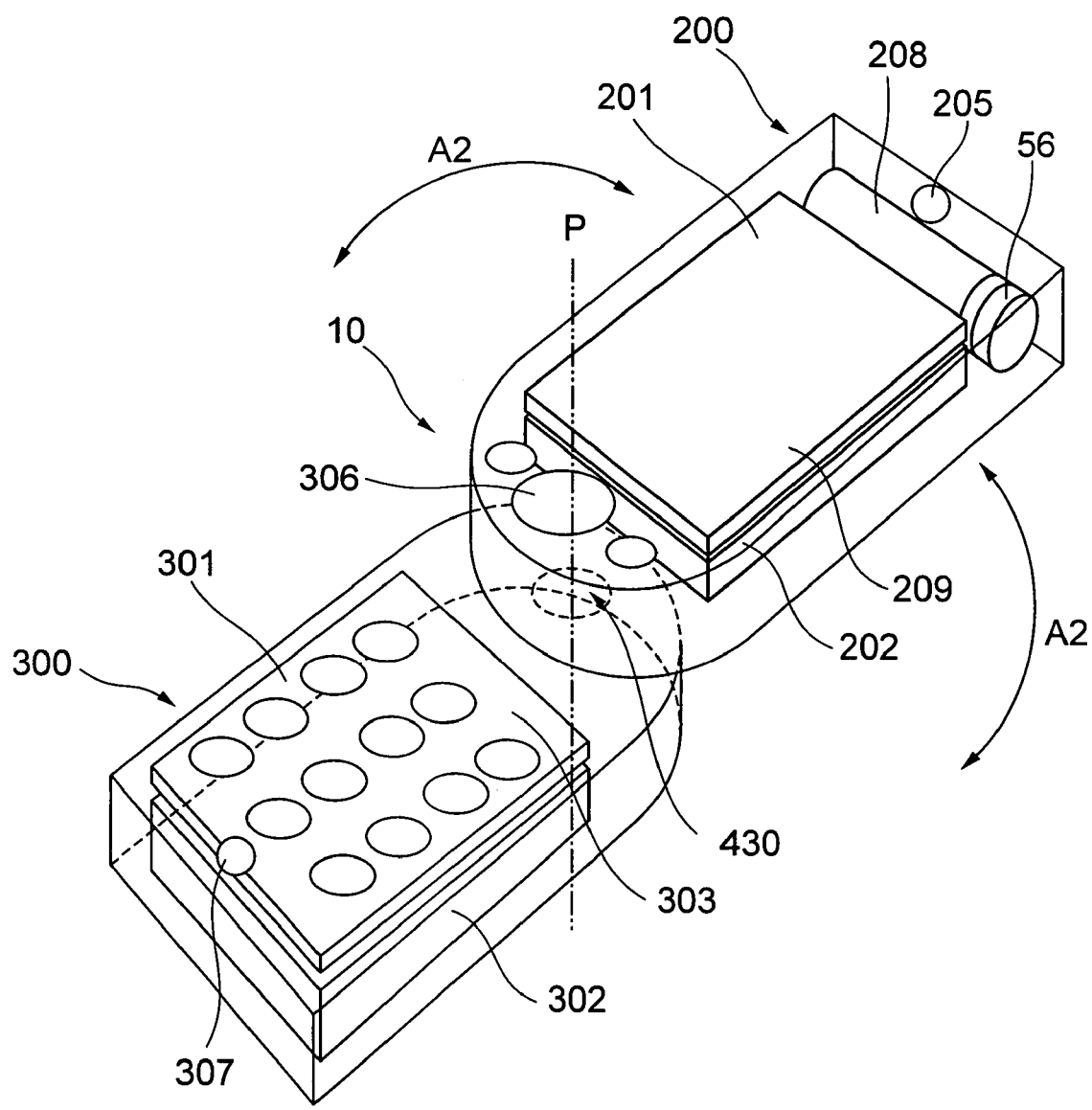
FIG. 11 is a conceptual diagram of a portable phone according to a fourth embodiment of the present invention.

Referring to FIGS. 9 and 10, a third embodiment of the present invention is described. FIGS. 9A to 9E are external views in the first state, in which FIG. 9A is a front view, FIG. 9B is a right-side view, FIG. 9C is a rear view, FIG. 9D is a top view, and FIG. 9E is a bottom view. FIGS. 10A to 10C are external views in the second state, in which FIG. 10A is a left-side view, FIG. 10B is a front view, and FIG. 10C is a rear view.

In FIGS. 9A-9E and 10A to 10C, the third embodiment is such that the grip housing 300 and the display housing 200 are coupled slidably by a slide hinge part 420. In other words, in this embodiment, a slide hinge part 420 is provided which slidably connects the layout face 303 of the grip housing 300 and the layout face 202 of the display housing 200 so that the two faces are engaged and can slide relative to each other in the vertical direction (as shown in the drawings).

The ten-key part 305 and the microphone part 307 are mounted on the layout face 303, and the rechargeable cell 302 is detachably mounted on the layout face 308. On the other hand, the display screen part 204, the speaker part 205, and the function key part 306 are mounted on the housing face 209 of the display housing 200.

In the portable phone which adopts the slide hinge part 420, the housing face 209 of the display housing 200 is always exposed in both of the two states; therefore, the display screen part 204, the speaker part 205, and the function key part 306 are provided constantly exposed. On the other hand, since the layout face 303 of the grip housing 300 is exposed only in the second state, the ten-key part 305 and the microphone part 307 can be exposed only when they are required.

Even with the portable phone that adopts the slide hinge part 420, the same interior layout as in the preceding embodiment may be used. However, in the case of this slide hinge part 420, the function key part 306 is arranged on the slide hinge part 420 side, the fuel cylinder may preferably be provided on the speaker part 205 side.

Embodiment 4

Referring to FIG. 11, a fourth embodiment of the present invention is next described. FIG. 11 is a conceptual diagram to show a general structure. In FIG. 11, the fourth embodiment is structured such that one end of the grip housing 300 overlaps one end of the display housing 200, and these two housings are connected rotatably at the rotary hinge part 430 which has a rotating axis P at right angles with the layout face 303.

The ten-key part 305 and the microphone part 307 are mounted on the layout face 303 and the detachable rechargeable cell 302 is mounted on the housing face 308. On the other hand, the display screen part 204, the speaker part 205, and the function key part 306 are mounted on the housing face 209 of the display housing 200.

With the portable phone that adopts the rotary hinge part 430, since the housing face 209 of the display housing 200 is always exposed in both of the two states, the display screen part 204, the speaker part 205, and the function key part 306 are provided constantly exposed. On the other hand, since the layout face 303 of the grip housing 300 is exposed only in the second state, the ten-key part 305 and the microphone part 307 can be exposed only when they are required.

Note that also in the fourth embodiment, as in the third embodiment, the fuel cylinder 208 and the governor 56 are preferably arranged on the speaker part 205 side.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A portable phone comprising:
   first and second housing members;
   a connecting member including a foldable hinge part for movably coupling together the first housing member and the second housing member,
   a power supply unit, wherein:
   said foldable hinge part couples said first housing member and said second housing member between a first state at which said first housing member and said second housing member are folded together, and a second state at which said first housing member and said second housing member are coupled at one end in a longitudinal direction of the first housing member and the second housing member, said first housing member includes a speaker part, a display part, a fuel cell part, and exhaust openings, and said second housing member includes a microphone part and a ten-key part, the power supply unit includes both a fuel cell part arranged to be provided within the first housing member for generating electric power by fuel to be supplied from outside the portable phone, and a rechargeable cell part arranged to be provided within the second housing member separately from the fuel cell part for storing electricity having been generated by said fuel cell part, at the second state, said speaker part and said microphone part are arranged at one end side of each of the first housing member and the second housing member opposite to the connecting member along the longitudinal direction, said ten-key part is arranged on a housing face to be concealed at the first state and to be exposed in the second state, and said exhaust openings are arranged on at least one surface of said first housing member along the longitudinal direction.

2. The portable phone according to claim 1, wherein:

said foldable hinge part foldably couples said first housing member and said second housing member, said display part and said speaker part are arranged on a first housing face of said first housing member so as to be concealed in the first state and exposed in the second state, said second housing member includes a function key part including, together with said ten-key part, cursor-move keys and function keys provided on a second housing face of said second housing member to be concealed in the first state and exposed in the second state, said function key part being arranged on said second housing face on said foldable hinge part side.

3. The portable phone according to claim 1, wherein said foldable hinge part slidably couples said first housing member and said second housing member, and wherein said first housing includes said display part, said speaker part, and a function key part on said first housing face always exposed both in the first and second states, said function key part being arranged on said first housing face on said foldable hinge part side.

4. The portable phone according to claim 1, wherein said foldable hinge part rotatably couples one end of said first housing member and one end of said second housing member through a rotating axis at right angles with said second housing face where said ten-key part is arranged, wherein said first housing member includes said display part, said speaker part, and a function key part provided on said first housing face always exposed both in the first and second states, said function key part being arranged on said first housing face on said foldable hinge part side.

5. The portable phone according to claim 1, wherein said foldable hinge part comprises:

a first hinge part formed at one end of one of the first housing member or the second housing member along the longitudinal direction of the one of the first housing member or the second housing member, a second hinge part arranged so as to be connected with the first hinge part, and formed at one end of the other one of the first housing member or the second housing member along the longitudinal direction of the other one of the first housing member or the second housing member, the first and the second hinge parts being arranged to be rotatable about a rotation axis of the foldable hinge part, and a fuel cylinder, mounted within the foldable hinge part including a center axis coinciding with the rotation axis of the hinge part, for storing energy to be supplied to the fuel cell part.

6. The portable phone according to claim 1, further comprising:

a fuel cylinder provided within the first housing member for storing energy to be supplied to the fuel cell part, the fuel cylinder being arranged to be exposed at both of the first state and the second state, and to be capable of being detachably mounted.

7. The portable phone according to claim 6, wherein said foldable hinge part foldably couples said first housing member and said second housing member, wherein said display part and said speaker part are arranged on said first housing face to be exposed in the first state and exposed in the second state, and wherein said second housing member further includes a function key part, together with said ten-key part, cursor-move keys and function keys provided on said second housing face to be concealed in the first state and exposed in the second state, said function key part being arranged on said second housing face on said foldable hinge part side.

8. The portable phone according to claim 6, wherein said foldable hinge part slidably couples said first housing member and said second housing member, and wherein said first housing member includes said display part, said speaker part, and a function key part provided on said first housing face always exposed both in the first and second states, said function key part being arranged on said first housing face on said foldable hinge part side.

9. The portable phone according to claim 6, wherein said foldable hinge part rotatably couples one end of said first housing member and one end of said second housing member through a rotating axis at right angles with said second housing face where said ten-key part is arranged, and wherein said first housing member includes said display part, said speaker part, and said function key part provided on said first housing face always exposed both in the first and second states, said function key part being arranged on said first housing face on said foldable hinge part.

* * * * *